United States Patent [19]

Buchelli et al.

[11] Patent Number: 5,504,166
[45] Date of Patent: Apr. 2, 1996

[54] POLYMERIZATION OF ALPHA-OLEFINS

[75] Inventors: Alberto Buchelli, Houston, Tex.; Malamas Caracotsios, Naperville, Ill.

[73] Assignee: Amoco Corporation, Chicago, Ill.

[21] Appl. No.: 475,042

[22] Filed: Jun. 7, 1995

Related U.S. Application Data

[63] Continuation of Ser. No. 222,962, Apr. 5, 1994, which is a continuation of Ser. No. 889,820, May 29, 1992, abandoned.

[51] Int. Cl.$^6$ ........................................................ C08F 2/14
[52] U.S. Cl. .................. 526/60; 526/65; 526/88; 525/53
[58] Field of Search ................... 526/60, 65, 88; 525/53

[56] References Cited

U.S. PATENT DOCUMENTS

| | | | |
|---|---|---|---|
| 4,469,853 | 9/1984 | Mori | 526/59 |
| 4,628,034 | 12/1986 | Hofferber | 526/59 |
| 4,742,131 | 5/1988 | Asanuma et al. | 526/59 |
| 4,921,919 | 5/1990 | Lin et al. | 526/88 |

FOREIGN PATENT DOCUMENTS

| | | |
|---|---|---|
| 0257316 | 3/1988 | European Pat. Off. . |
| 0318609 | 6/1989 | European Pat. Off. . |
| 0328826 | 8/1989 | European Pat. Off. . |
| 0398706 | 11/1990 | European Pat. Off. . |

OTHER PUBLICATIONS

Patent Abstracts of Japan, Aug. 29, 1987 (JP 62070404).

*Primary Examiner*—Joseph L. Schofer
*Assistant Examiner*—Tom Weber
*Attorney, Agent, or Firm*—James R. Henes; Wallace L. Oliver

[57] ABSTRACT

An advanced control method is disclosed for the polymerization of an alpha-olefin in a substantially horizontal, quench-cooled, stirred bed reactor.

13 Claims, 2 Drawing Sheets

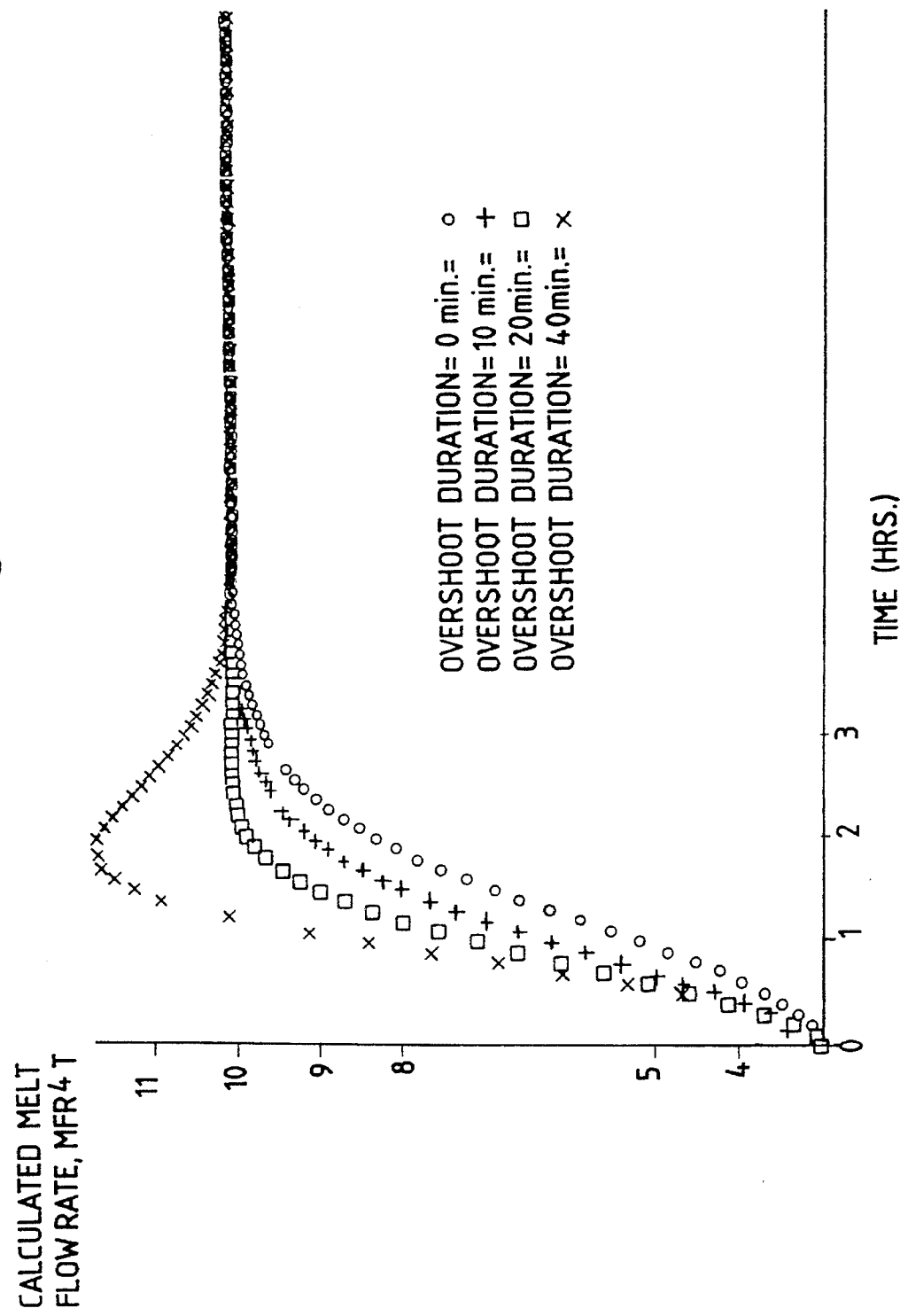

POLYMERIZATION OF ALPHA-OLEFINS

This is a continuation of application Ser. No. 08/222,962, filed Apr. 5, 1994, pending which in turn is a continuation of application Ser. No. 07/889,820 filed on May 29, 1992 now abandoned.

BACKGROUND OF THE INVENTION

1. Field of the Invention

This invention relates generally to a process for the continuous polymerization of an alpha-olefin in the vapor phase in a substantially horizontal, quench-cooled, stirred-bed reactor, and more particularly relates to the control of the aforesaid process to produce a solid polymer having predetermined properties.

2. Discussion of the Prior Art

Shepard et al., U.S. Pat. No. 3,957,448; Jezl et al., U.S. Pat. No. 3,965,083; Jezl et al., U.S. Pat. No. 3,970,611; Peters et al., U.S. Pat. No. 3,971,768; Stasi, U.S. Pat. No. 4,021,024; Jezl et al., U.S. Pat. No. 4,101,289; Jezl et al., U.S. Pat. No. 4,129,701; and Kreider et al., U.S. Pat. No. 4,640,963, disclose various specific embodiments of a general method performed in a substantially horizontal reactor for the vapor-phase polymerization of at least one alpha-olefin monomer in a reaction mixture comprising a first alpha-olefin monomer and, if copolymerization is occurring, a second alpha-olefin monomer. The general method disclosed comprises: conducting the polymerization under polymerization conditions of temperature and pressure in the presence of hydrogen and a catalyst system comprising a solid catalyst comprising a first meted and a cocatalyst comprising a second meted in a reactor wherein at least a portion of the heat of polymerization is removed by evaporative cooling of a readily volatilizable quench liquid, and wherein the reactor comprises a substantially horizontal reactor of substantially circular cross-section containing a centrally-located drive shaft extending longitudinally through said reactor to which are attached a plurality of adjacently located paddles, which paddles cause essentially no forward or backward movement of the particulate homopolymer or copolymer product contained in the reactor and extend transversely within and to a short distance from the internal surfaces of the reactor; driving means for the drive shaft; one or more reactor off-gas outlets spaced along the topward part of the reactor; a plurality of vapor recycle inlets spaced along the bottomward part of the reactor; one or more catalyst and cocatalyst addition inlets spaced along the reactor; a plurality of quench liquid inlets spaced along the topward part of the reactor whereby quench liquid can be introduced into the reactor; and take-off means for the particulate polymer product at one or both ends of the reactor.

In the preparation of solid polymers from alpha-olefins in a gas-phase polymerization in the aforesaid substantially horizontal, quench-cooled stirred-bed reactor, it would be highly desirable to control the polymerization reaction so as to provide a polymer product having predetermined and constant properties. In addition, a great deal of off-specification polymer product is produced during a transition period during which the polymerization conditions are changed from those employed in the manufacture of one grade of a polymer having one set of properties to those employed in the manufacture of another grade of the same polymer having a different set of properties or from those employed in the manufacture of homopolymer to those employed in the manufacture of a copolymer or vice versa.

In the operation of the aforesaid substantially horizontal, quench-cooled stirred bed polymerization reactor unit, there are a number of process changes that can lead to a situation where the process variables and product properties change with time. Several of these transient situations are operator induced while others are inherent to the process or caused by circumstances beyond the process operator's control. Among those situations controlled by the operator are: shut-down, start-up, production rate changes, and product grade changes. Grade changes tend to be very complex and time consuming. The main reason for the unusual complexity is that each grade change requires by definition that the plant's steady-state operating conditions be substantially disturbed. Furthermore, the problem is aggravated by the fact that during the transition several operating variables can change simultaneously. For example, some variables, like reactor temperature, pressure and catalyst feed, control the reaction rate, whereas others, such as hydrogen and/or propylene partial pressures, control the transition's speed and the ultimate polymer properties. Grade changes are always coupled with cost penalties due to the generation of off-specification material during the product transition.

Thus, in order to quantify the cost penalties associated with product transitions, it would be highly desirable to develop a mathematical model of the process. A critical utilization of this process model is in the form of an advanced control method that can be utilized for on-line minimization of grade transition times and to maintain safe operation from one product transition to another. It would also be desirable to reduce this transition period and the amount of off-specification polymer produced during the transition period. Thus far, no method has been disclosed for controlling the continuous vapor-phase polymerization in the aforesaid substantially horizontal, quench-cooled, stirred-bed reactor.

The desired control of the polymerization process is extremely difficult to attain because of the holdup time of polymerization reactors and the time involved in obtaining polymer samples and measuring the properties of those samples. Because of this time period, the polymerization conditions employed in the reactor at the time at which a property of a polymer sample withdrawn from the reactor is measured are not necessarily the same as the polymerization conditions employed in the reactor at the time at which such polymer sample was produced in the reactor and/or withdrawn from the reactor. This is especially the case when the attempted control of the polymerization process is based on the measurement of the melt How rate—or in other words, the melt index—of the polymer product as determined according to the ASTM Test D-1238-62T. Although the melt flow rate or the melt index is a satisfactory control property for most solid polymers prepared from alpha-olefins, the time consumed in obtaining a polymer sample for measurement and in measuring the melt index of the sample, combines with the aforesaid holdup time of the reactor to seriously hamper accurate control of the polymerization process.

Consequently, it is highly desirable to develop an advanced on-line control method for the continuous gas-phase polymerization of alpha-olefins in the aforesaid substantially horizontal, quench-cooled, stirred-bed reactor, which is based on measurements in real time of polymerization conditions in the reactor at the same time the control is being implemented. Such control methods have been disclosed for use in liquid phase polymerization reactor systems. For example, Smith et al., U.S. Pat. No. 3,356,667 discloses a method and apparatus for controlling reaction conditions of an alpha-olefin polymerization in the liquid phase in order to produce a solid polymer having specific properties. In addition to the basic reactor system, the apparatus disclosed as being useful in the practice of the disclosed method includes: means for feeding catalyst and reactant materials to the reactor system, means for withdrawing an effluent product stream from the reactor system, means for removing reaction heat from the reactor system, computing means for establishing an output control signal representative of the instantaneous melt index of the polymer being produced in the reaction mixture, a second output signal representative of the averaged melt index of the polymer in the effluent product stream removed from the reactor system, a third output signal representative of the average percent hydrogen in the reaction mixture within the reactor, and means for applying the output signal representative of the instantaneous polymer melt index to control the rate of hydrogen addition to the reactor system so as to yield a polymer product having a predetermined melt index based on a predetermined concentration of hydrogen in the reaction zone. Also disclosed are computing means for establishing an output signal representative of polymer production rate and associated means for controlling the rate of addition of catalyst to the reactor in response to the computed production rate.

Smith et al., U.S. Pat. No. 3,356,667 also discloses that both the instantaneous melt index value of the polymer in the reaction zone and the melt index value of the polymer in the effluent from the reactor can be determined by automatically computing these melt index values from the input data of various process variables of the reaction system. The computer inputs include (1) concentration of hydrogen in the monomer feed, (2) polymer concentration (percent solids) in the reactor system, (3) temperature of the reaction mixture, (4) rate of flow of the monomer to the reactor, and (5) a time factor to compensate for delay. The production rate is also disclosed as a useful input signal. Thus, regulation of the hydrogen feed rate is accomplished in response to a hydrogen analysis in the feed corrected to indicate the hydrogen concentration in the liquid phase in the reactor. In addition, output signals representative of the melt index of the polymer in the reactor effluent and the concentration of hydrogen in the reaction liquid are obtained.

The control system disclosed in the aforesaid U.S. Pat. No. 3,356,667 employs as a basic unit thereof a computer which is adapted to receive input signals representative of the flow rate of propylene fed to the reactor system, the hydrogen concentration in the propylene feed, the temperature of the reaction liquid in the reactor, and the percent solids (percent polymer) in the reaction mixture in the reactor. The signal representative of the flow rate of propylene, the signal representative of the hydrogen concentration, the signal representative of the temperature of the reaction contents in the reactor, the signal representative of the polymer concentration (percent solids), and the signal representative of production rate are transmitted to the computer. The computer accepts the input signals from the primary measurement devices and produces three principal output signals that are linearly proportional to the following process variables: (1) an output signal representing the concentration of hydrogen in the reaction liquid phase; (2) an output signal representing the instantaneous melt index of the polymer presently being produced in the reactor reaction mixture and (3) an output signal representing the integrated melt index of the polymer in the effluent stream removed from the reactor. The computer automatically combines the input signal to produce control output signals that are proportional to the instantaneous melt index, the concentration of hydrogen in the reaction liquid phase, and the melt index of the polymer in the reaction effluent and that are in response to the input signals.

A first control output signal proportional to the melt index of the polymer being produced at any instant within the reactor (instantaneous melt index) is transmitted to a melt index-recording-controller. The computed instantaneous melt index is compared by the controller with a predetermined desired polymer melt index value (set point), and a signal representative of this comparison is transmitted to manipulate the set point of an analyzer-recorder-controller. By so operating, in the method disclosed in the aforesaid U.S. Pat. No. 3,356,667, the concentration of hydrogen in the reactor is maintained at a value capable of producing a polymer product having a predetermined melt index.

Furthermore, Smith, U.S. Pat. No. 3,614,682 discloses a method for the digital computer control of a polymerization process that is performed in a continuously operating series of stirred reactors wherein each reactor continuously receives discharge of the preceding reactor in the series and continuously discharges into the succeeding reactor in the series. It is disclosed that at stated intervals, a computer begins a cycle, the first portion of which is a simulation routine whereby changes, since the last simulation, in important variables which take place at various points in the successive reactors in the train of reactors and which cannot be directly measured are followed by periodically numerically integrating by a digital computer for each reactor and for each of the variables, the equation $$\frac{dX_i}{dt} = \frac{F}{V}(X_{i,n-1} - X_{i,n}) + \left(\frac{\delta X_{i,n}}{\delta t}\right)$$

wherein, in the terms employed in U.S. Pat. No. 3,614,682, X is a process variable like concentration, conversion, etc., i is the first subscript of X and signifies that this is the ith of i variables, n is the second subscript of X and signifies that this is the value of this variable in the nth one of the reactors in the train of reactors, F is the total volumetric flow rate, V is the volume of the nth reactor, t is the time under the reaction conditions, and $\delta X_{i,n}/\delta t$ is the overall rate of generation or degeneration of X under the conditions in the nth reactor. The resulting calculated values of these variables, together with directly measured values of other variables, are then manipulated by the computer and used to adjust the rate of feed of reagents and other conditions of polymerization in the train of reactors.

OBJECTS OF THE INVENTION

It is therefore a general object of the present invention to provide an improved method and control for the continuous, gas-phase polymerization of an alpha-olefin in a substantially horizontal, quench-cooled, stirred-bed reactor to produce solid polymer product having pre-determined properties.

More particularly, it is an object of the present invention to provide a method for the advanced control of the aforesaid polymerization to produce a polymer product having a pre-determined melt flow rate.

It is a further object of the present invention to provide a method for the advanced control of the aforesaid polymerization to produce a copolymer product of a first monomer and a second monomer having a predetermined content of the second monomer.

It is a further object of the present invention to provide an improved aforesaid advanced control method of the aforesaid polymerization under both steady state and transition conditions.

It is another object of the present invention to provide an improved aforesaid advanced control method of the aforesaid polymerization for the manufacture of homopolymers, random copolymers and impact copolymers.

Other objects and advantages of the present invention will become apparent upon reading the following detailed description and appended claims.

SUMMARY OF THE INVENTION

These objects are achieved by the method of this invention for the vapor-phase polymerization of at least one alpha-olefin monomer in a reaction mixture comprising a first alpha-olefin monomer and, if copolymerization is occurring, a second alpha-olefin monomer, comprising: conducting the polymerization under polymerization conditions of temperature and pressure in the presence of hydrogen and a catalyst system comprising a solid catalyst comprising a first metal and a cocatalyst comprising a second metal, in at least one reactor wherein in each such reactor at least a portion of the heat of polymerization is removed by evaporative cooling of a volatilizable quench liquid comprising liquefied first monomer and, if copolymerization is occurring, liquefied second monomer and wherein each reactor is a substantially horizontal reactor of substantially circular cross-section containing a centrally-located drive shaft extending longitudinally through such reactor to which are attached a plurality of adjacently located paddles, which paddles cause essentially no forward or backward movement of the particulate polymer product contained in such reactor and extend transversely within and to a short distance from the internal surfaces of such reactor; driving means in each such reactor for the drive shaft; one or more reactor off-gas outlets spaced along the topward part of each such reactor; a plurality of vapor recycle inlets spaced along the bottomward part of each such reactor for recycle of unreacted first monomer and, if copolymerization is occurring, unreacted second monomer; one or more catalyst and cocatalyst addition inlets spaced along each such reactor; a plurality of quench liquid inlets spaced along the topward part of each such reactor whereby quench liquid can be introduced into such reactor; and take-off means in each such reactor for said particulate polymer product at one or both ends of such reactor.

In the method of the presentation invention, the performance of the aforesaid polymerization reaction is controlled in order to afford the production in each such reactor of a particulate polymer product having predetermined characteristics of at least one of the melt flow rate thereof and weight percent therein of the second monomer, if any, by a method comprising, for each reactor employed: ($a_1$) determining relationships between the melt flow rate of the particulate polymer product withdrawn from such reactor and a first set of parameters comprising the rates of introduction of quench liquid and vapor recycle into each zone of such reactor, the heat of polymerization in such reactor, the latent heat of vaporization of the quench liquid in such reactor, the total mass inventory of particulate product in such reactor and, the fraction in each zone of such reactor of the aforesaid total mass inventory in such reactor, the mole ratio of hydrogen to the first monomer in the vapor phase in such reactor, the mole ratio of the second monomer to the first monomer in the vapor phase in such reactor, the mole ratio of the aforesaid second metal to the aforesaid first metal introduced into such reactor, the molecular weights of the first and second monomers, and the temperature and pressure in such reactor; ($b_1$) monitoring such first set of parameters; ($c_1$) from the first set of parameters monitored in step ($b_1$) and the relationships from step ($a_1$), calculating the melt flow rate of the polymer withdrawn from such reactor and ($d_1$) adjusting at least one of the reactor operating variables within minimum and maximum constraints thereof to adjust the calculated melt flow rate of the polymer withdrawn from such reactor to a pre-determined, set point level therefor, wherein such reactor variables are the mole ratio of the second monomer to the first monomer, if copolymerization is occurring, in the vapor phase in such reactor in the range of from about 0.0005 to about 0.5, the mole ratio of hydrogen to the first monomer in the vapor phase in such reactor in the range of from about 0.0005 to about 0.08, the mole ratio of the second metal to the first metal introduced into such reactor in the range of from about 14 to about 200, the rate of introduction of the quench liquid into each zone of such reactor in the range of from about 5 to about 50 kg/sec, the ratio of the rate of introduction of the vapor recycle to the rate of introduction of quench liquid into each zone of such reactor in the range of from about 0.05 to about 0.3, and the temperature in such reactor in the range of from about 20° C. to about 100° C.

BRIEF DESCRIPTION OF THE DRAWINGS

For a more complete understanding of the present invention, reference should now be made to the embodiments illustrated in greater detail in the accompanying drawings and described below by way of examples of the invention. In the drawings:

FIG. 2 is a plot of the calculated melt flow rates of polypropylene withdrawn from a reactor versus the time during the transition when the mole ratio of hydrogen to propylene is first increased from that level therefor at which a polypropylene product that has a melt flow rate of 3 is produced at steady state to that level therefor at which a polypropylene product that has a melt flow rate of 10 is produced at steady state.

Figure 1:
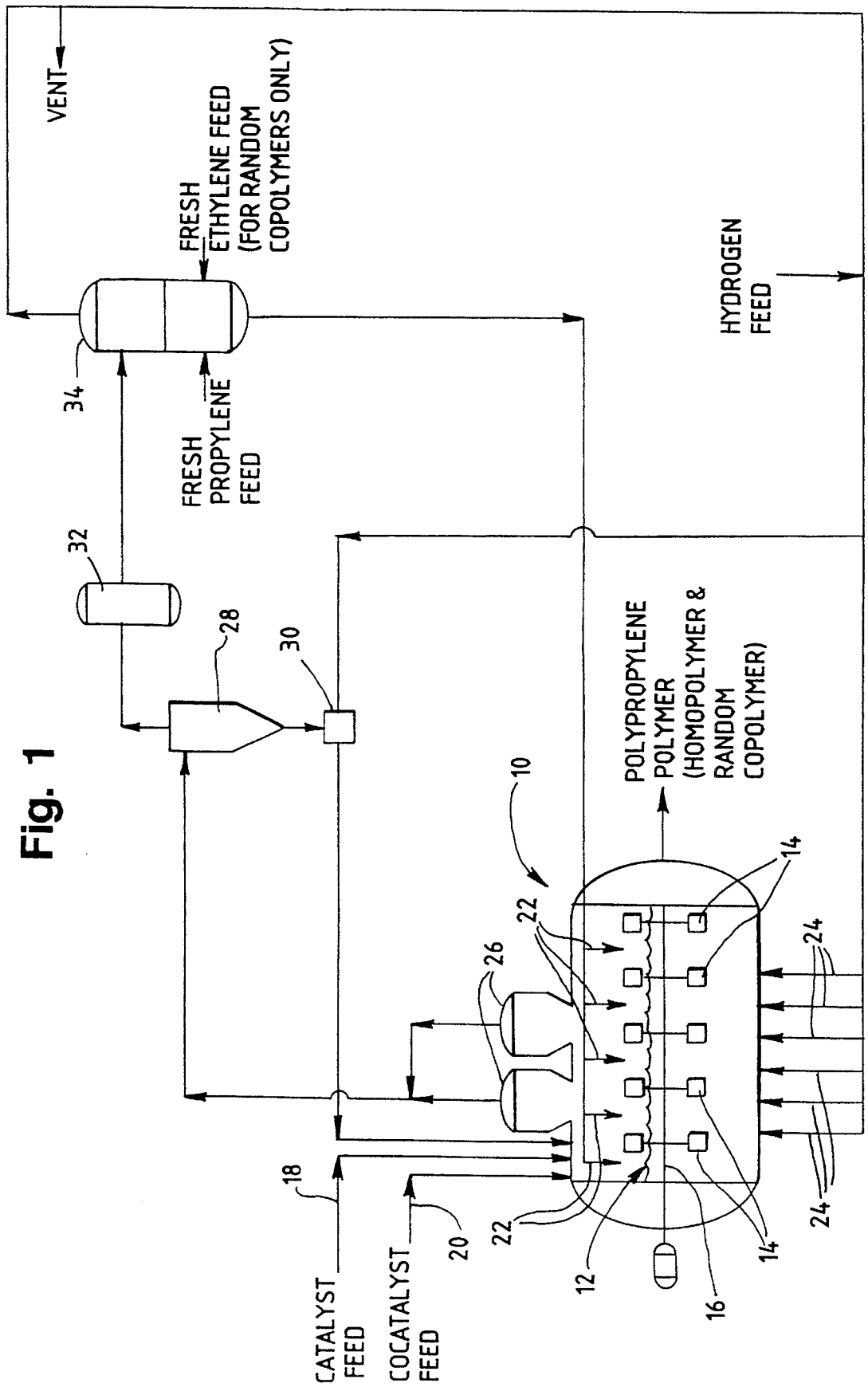
FIG. 1 is a schematic drawing of the single substantially horizontal, quench-cooled, stirred bed reactor and associated equipment as employed in the method of this invention for the polymerization of propylene to form polypropylene or for the copolymerization of propylene and ethylene to form a copolymer of propylene and ethylene.

It should be understood that in certain instances, details which are not necessary for an understanding of the present invention or which render other details difficult to perceive may have been omitted. It should be understood, of course, that the invention is not necessarily limited to be particular embodiments illustrated herein.

DETAILED DESCRIPTION OF THE PREFERRED EMBODIMENTS

The present invention is a method for controlling the continuous gas-phase polymerization of an alpha-olefin in a substantially horizontal, quench-cooled stirred-bed reactor, various specific embodiments of which are disclosed in Shepard et al., U.S. Pat. No. 3,957,448; Jezl et al., U.S. Pat. No. 3,965,083; Jezl et al., U.S. Pat. No. 3,970,611; Peters et al., U.S. Pat. No. 3,971,768; Stasi, U.S. Pat. No. 4,021,024; Jezl et al., U.S. Pat. No. 4,101,289; Jezl et al., U.S. Pat. No.

4,129,701; and Kreider et al., U.S. Pat. No. 4,640,963, each of which in its entirety is specifically incorporated herein by reference.

The method of the present invention is employed with at least one substantially horizontal reactor of substantially circular cross-section containing a centrally-located drive shaft extending longitudinally through each such reactor, to which are attached a plurality of adjacently located paddles, which paddles cause essentially no forward or backward movement of the particulate polymer product contained in such reactor and extend transversely within and to a short distance from the internal surfaces of such reactor; driving means in each such reactor for the drive shaft; one or more reactor off-gas outlets spaced along the topward part of each such reactor; a plurality of vapor recycle inlets spaced along the bottomward part of the reactor; one or more catalyst and cocatalyst addition inlets spaced along each such reactor; a plurality of quench liquid inlets spaced along the topward part of each such reactor whereby quench liquid can be introduced into each such reactor; and take-off means in each such reactor for the particulate product at one or both ends, preferably at one end of such reactor.

The polymerization process using a single aforesaid substantially horizontal reactor for manufacturing a homopolymer, for example, of propylene, and a random copolymer, for example, of propylene and ethylene is shown schematically in FIG. 1. In FIG. 1, the vessel where the polymerization occurs is a horizontal cylindrical reactor 10 that contains, for example, polypropylene powder 12, agitated by a series of flat paddles 14 attached to a center shaft 16. The reactor 10 operates under an internal pressure of about 200–400 psig and at a temperature of about 50°–90° C. The powder level in the reactor 10 is maintained at approximately 40–60 percent of the total reactor level while the catalyst and cocatalyst are fed into the reactor 10 through one o#more possible locations 18 and 20. Optionally, a modifier such as a silane modifier is also introduced in a single stream into the top of the reactor 10 through one or more possible locations. The reactor temperature is mainly controlled by means of a recycle liquid propylene which is sprayed at several axial locations 22 onto the bed. The propylene quench liquid is vaporized after absorbing the heat of the polymerization reaction. Recycle gas is returned to the bottom of the reactor 10 at a number of inlets 24. Make-up hydrogen is introduced into the suction of the recycle gas compressor (not shown) for melt flow rate adjustment.

The vaporized propylene exits the reactor through two large domes 26 that are connected to the top of the reactor 10. The domes 26 are designed to allow only small particles (fines) to exit the reactor 10. The gases and the entrained polymer fines are fed to a cyclone 28. The fines that are removed from the gas are then returned to the top of the reactor 10 as close to the front as possible by means of a fines' recycle ejector 30. The gas is sent to a condenser 32.

The reactor off-gas is then partially condensed in a horizontal condenser 32. The gas and liquid from the condenser 32 are separated in the overhead separator drum 34. Part of the recycle gas is vented on flow control to remove the propane accumulated in the system. In this manner a constant propylene partial pressure is kept in the reactor vapor space. The remaining gas is slightly superheated in the recycle gas heater (not shown) to prevent condensation before it is mixed with hydrogen and compressed in the recycle gas compressor (not shown). The majority of the stream from the discharge of the recycle gas compressor is returned to the reactor 10, while a small amount is sent to the reactor fines' recycle ejector 30 that returns the fines removed from the cyclone 28. Fresh polymer grade propylene feed containing small amounts of propane impurities is fed to the overhead separator drum 34. The quench liquid is returned to the reactor 10 by means of a pump (not shown) that provides a constant pressure at the quench liquid nozzle inlets 22, so that the liquid spray pattern remains the same. Polypropylene powder is discharged periodically from the reactor 10, on time control, to a gas expansion bag filter (not shown).

In the manufacture of random copolymers, an ethylene gas stream is introduced into the overhead reactor separator drum 34 as can be seen in FIG. 1. The ethylene gas is carried with the propylene gas that returns to the reactor 10 by means of the recycle gas compressor. Some ethylene will leave the reactor 10 with the gas that is vented to remove the accumulated impurities (propane and ethane). The random copolymer powder is discharged from the reactor, on time control, to a gas expansion bag filter (not shown).

For the purpose of this invention, the aforesaid substantially horizontal, quench cooled stirred bed reactor employed in the method of this invention is viewed as a series of zones whereby, each such zone is characterized during non-steady state operation, in that polymer product particles therein have uniform properties and is preceded and succeeded by adjacent zones of similarly uniform properties but different from the zone in question. Thus, a given property of the particulate polymer product is the same within a zone but changes from one zone to the next. Thus, the zones are treated as continuous stirred tank reactors in accordance with the approach discussed in detail in Chapter 9 entitled "Nonideal Flow" on page 253–325 in O. Levenspiel, *Chemical Reaction Engineering*, John Wiley & Sons, New York, 1972. The number of zones in an aforesaid substantially horizontal reactor employed in the method of this invention is determined in accordance with the methods and calculations in pages 290–304 of Levenspiel.

As employed herein, unless otherwise indicated, the term "polymerization" is intended to include both homopolymerization and copolymerization, and the term "polymer" is intended to include both homopolymer and copolymer.

The method of this invention is useful in the stereospecific polymerization of alpha-olefins containing 3 or more carbon atoms such as propylene, butene-1, pentene-1, 4-methylpentene-1, and hexene-1, as well as mixtures thereof and mixtures thereof with ethylene. The method of this invention is particularly effective in the stereospecific polymerization of propylene or mixtures thereof with ethylene or a higher alpha-olefin. According to the invention, highly crystalline polyalpha-olefin homopolymers or copolymers are prepared by contacting at least one alpha-olefin with the catalyst described hereinbelow under polymerization conditions. Such conditions include polymerization temperature and time, pressure(s) of the monomer(s), avoidance of contamination of catalyst, the use of chain transfer agents to control polymer molecular weights, and other conditions well known to persons skilled in the art.

In the method of the present invention, polymerization should be carried out at temperatures sufficiently high to ensure reasonable polymerization rates and to avoid unduly long reactor residence times, but not so high as to result in the production of unreasonably high levels of stereorandom products due to excessively rapid polymerization rates. Generally, temperatures range from about 0° to about 120° C., with a range of from about 20° C. to about 95° C. being preferred from the standpoint of attaining good catalyst performance and high production rates. More preferably, polymerization according to this invention is carried out at temperatures ranging from about 50° C. to about 80° C.

Alpha-olefin polymerization according to this invention is carried out at monomer pressures of about atmospheric or above. Monomer pressures should not be below the vapor pressure at the polymerization temperature of the alpha-olefin to be polymerized, and generally monomer pressures range from about 20 to about 600 psi.

The amount of the catalyst or catalyst component to be employed in the method of this invention varies depending on choice of reactor size, monomer to be polymerized, the specific catalyst used, and other factors known to persons of skill in the art. Typically, a catalyst or catalyst component is used in amounts ranging from about 0.2 to 0.02 milligrams of catalyst to gram of polymer produced.

The Ziegler catalysts to be used in the preparation of polyolefins according to the present invention generally contain two major components: (a) a compound of a transition metal belonging to Group IV to VI in the Mendelejeff's periodic table, and (b) an organometallic compound or hydride of a metal belonging to Group I to III in the periodic table. Especially preferred are those that contain as the major constituent a titanium or vanadium halide, and an organoaluminum compound. The components (a) and (b) may be supported on a carrier or may be denatured with a denaturing agent such as an electron donor. As the Ziegler catalysts in the present invention, there may be employed those disclosed, for example, in U.S. Pat. Nos. 3,257,332; 3,826,792; 3,113,115; 3,546,133; 4,125,698; 4,071,672; 4,071,674; 3,642,746; 3,051,690 and 3,058,963, and British Pat. No. 1,140,649.

While a wide variety of organometallic systems or solid catalysts can be employed for the polymerization of olefins, particularly propylene, to solid polymers, it is often preferred to use a catalyst which includes a combination of an aluminum alkyl and a titanium halide, preferably a dialkyl aluminum chloride or bromide, including mixtures of the two halides, in which the alkyl groups have from 1 to 12 carbon atoms each and a titanium chloride. The catalyst system most preferred is a mixture of diethylaluminum chloride and a titanium chloride complex. The titanium chloride complex is preferably an aluminum-reduced titanium tetrachloride formed by reacting aluminum with titanium tetrachloride. The preferred aluminum-reduced $TiCl_4$ can be described as being of the composition $TiCl_3$—$\chi AlCl_3$ in which $\chi$ is a number in the range of 0.1 to 1.0. A convenient method for the preparation of such a material is by reduction of titanium tetrachloride with metallic aluminum according to the formula $3TiCl_3$—$AlCl_3$. This reaction is generally carried out at an elevated temperature, for example, a temperature in the range 300° to 650° F., preferably 375° to 450° F.

In general, the catalysts which are most useful to the process described herein are those which are very active and give a high yield on catalyst. Included in this group are cocatalysts composed or organometallic compounds of Periodic Groups IA, IIA and IIIA and catalysts which are based on transition metal compounds. Aluminum alkyl compound cocatalysts are especially preferred and may be a trialkylaluminum or an alkylaluminum halide such as a dialkylaluminum chloride. The transition metal catalyst can be a metal compound of Group IV or Group V such as a titanium or vanadium compound, a compound of Group VI such as chromium or molybdenum oxide or may be one of the above catalysts supported on a magnesium-based support or a support such as alumina, silica, or silica-alumina. The preferred catalysts and cocatalysts are the aforesaid high yield catalysts. By high yield is meant catalysts and cocatalysts the residues of which do not have to be removed from the products of the polymerization process.

More particularly, the catalyst system employed herein comprises the catalyst or catalyst component described hereinbelow and a cocatalyst component comprising a Group IIA or IIIA metal alkyl. Group IIA and IIIA metal alkyls that are suitable for use as such cocatalyst component are compounds of the formula $MR_m$ wherein M is a Group IIA or IIIA metal, each R is independently an alkyl radical of 1 to about 20 carbon atoms, and m corresponds to the valence of M. Examples of useful metals, M, include magnesium, calcium, zinc, cadmium, aluminum, and gallium. Examples of suitable alkyl radicals, R, include methyl, ethyl, butyl, hexyl, decyl, tetradecyl, and eicosyl. From the standpoint of catalyst component performance, preferred Group IIA and IIIA metal alkyls are those of magnesium, zinc, or aluminum wherein the alkyl radicals contain 1 to about 12 carbon atoms. Specific examples of such compounds include $Mg(CH_3)_2$, $Mg(C_2H_5)_2$, $Mg(C_2H_5)(C_4H_9)$, $Mg(C_4H_9)_2$, $Mg(C_6H_{13})_2$, $Mg(C_{12}H_{25})_2$, $Zn(CH_3)_2$, $Zn(C_2H_5)_2$, $Zn(C_4H_9)_2$, $Zn(C_4H_9)(C_8H_{17})$, $Zn(C_6H_{13})_2$, $Zn(C_6H_{13})_3$, and $Al(C_{12}H_{25})_3$. More preferably a magnesium, zinc, or aluminum alkyl containing 1 to about 6 carbon atoms per alkyl radical is used. Best results are achieved through the use of trialkylaluminums containing from 1 to about 6 carbon atoms per alkyl radical, and particularly trimethylaluminum, triethylaluminum and triisobutylaluminum, or a combination thereof. If desired, metal alkyls having one or more halogen or hydride groups can be employed, such as ethylaluminum dichloride, diethylaluminum chloride, ethylaluminum sesquichloride, diethylaluminum hydride, diisobutylaluminum hydride, and the like.

In addition to the catalyst or catalyst component described hereinbelow and aforesaid cocatalyst component, the catalyst system employed in the method of the present invention typically includes an aliphatic or aromatic organosilane compound. A suitable class of organosilane comprises either (1) $R_1(R_2)_xSi(OR_4)_y(OR_5)_z$ wherein $R_1$ and $R_2$ are the same or different and are each isopropyl, isobutyl, sec-butyl, t-butyl, isopentyl, t-pentyl, neopentyl, phenyl, tolyl, naphthyl, or $cycloC(R_3)_{2n-1}$, wherein cycloC is a cyclobutyl, cyclopentyl or cyclohexyl cycloaliphatic ring attached to the silicon atom and $R_3$ is hydrogen or an alkyl group having from 1 to 5 carbon atoms and is a substituent to the cycloaliphatic ring, and wherein n is 4, 5 or 6 when the cycloaliphatic ring is cyclobutyl, cyclopentyl or cyclohexyl, respectively, wherein $R_4$ and $R_5$ are the same or different and are each methyl, isopropyl, or sec- or t-butyl, and, wherein y is 1, 2 or 3, z is 0 or 1, y+z is 2 or 3, and x is 3-(y+z). Preferably, z is 0, y is 2, $R_4$ is methyl or t-butyl, x is 1 and $R_1$ and $R_2$ are the both isopropyl, isobutyl, t-butyl, isopentyl, t-pentyl, or neopentyl. Typically, the silane employed as an external modifier in the method of this invention is diisopropyldimethoxysilane, diisobutyldimethoxysilane, di-t-butyldimethoxysilane, t-butyltrimethoxysilane, diisopentyldimethoxysilane, di-t-pentyldimethoxysilane, dineopentyl-dimethoxysilane, neopentyltrimethoxysilane, isobutylisopropyl- dimethoxysilane, isobutyl-t-butyldimethoxysilane, and iso-propyl-t-butyldimethoxysilane and di-p-tolyldimethoxysilane. Preferably, the silane employed as an external modifier is diisopropyldimethoxysilane or di-t-butyldimethoxysilane.

The aforesaid silane is present in the catalyst system employed in the method of this invention at a molar ratio of the metal in the cocatalyst to silane in the range of from about 1, preferably from about 3, to about 50, preferably to about 30.

Thus, a typical catalyst system for the polymerization or copolymerization of alpha-olefins by the method of this invention is formed by combining the supported titanium-containing catalyst or catalyst component described hereinbelow and an aforesaid alkyl aluminum compound as catalysts, together with the aforesaid silane. Typically, useful aluminum-to-titanium atomic ratios in such catalyst systems are about 10 to about 500 and preferably about 30 to about 400. Typical aluminum-to-silane compound molar ratios in such catalyst systems are about 3 to about 30.

Titanium-containing catalyst components that are especially useful in this invention are supported on hydrocarbon-insoluble, magnesium-containing compounds which are optionally in combination with an electron donor compound as an internal modifier. Such supported titanium-containing olefin polymerization catalyst component typically is formed by reacting a titanium (IV) halide, a magnesium-containing compound, and optionally an organic electron donor compound. Optionally, as described hereinbelow, such supported titanium-containing reaction product may be further treated or modified by comminution or further chemical treatment with additional electron donor or Lewis acid species.

Suitable magnesium-containing compounds include magnesium halides; a reaction product of a magnesium halide such as magnesium chloride or magnesium bromide with an organic compound, such as an alcohol or an organic acid ester, or with an organometallic compound of metals of Groups I–III; magnesium alcoholates; or magnesium alkyls.

One possible magnesium-containing compound, described in U.S. Pat. No. 4,277,370, is based on at least one magnesium alcoholate which may be pretreated with at least one modifier such as a mineral acid or anhydride of sulfur, organometallic, chalcogenide derivative of hydrogen sulfide, and organic acids and esters thereof. Such magnesium-containing compound may be the pretreatment product of at least one magnesium alcoholate, at least one Group II or IIIA metal alkyl and, optionally, at least one modifier such as a mineral acid or an anhydride, sulfur, organometallic chalcogenide derivatives of hydrogen sulfide, organic acids and organic acid esters. Solid magnesium alkoxide may be milled prior to further treatmen In another catalyst component, magnesium ethoxide may be reacted with an aromatic ester such as phenyl benzoate prior to further treatment with a Lewis add.

Another possible catalyst component is described in U.S. application Ser. No. 674,966, filed Dec. 26, 1984, now U.S. Pat. No. 4,671,770, assigned to a common assignee, which is incorporated by reference herein. The catalyst component described therein is prepared by complexing a magnesium alkyl composition with a specific class of hindered aromatic ester such as ethyl 2,6-dimethylbenzoate followed by reaction with a compatible precipitation agent such as silicon tetrachloride and a suitable titanium (IV) compound in combination with an organic electron donor compound in a suitable diluent.

Another possible and preferable, catalyst component is described in U.S. Ser. No. 875,180, filed Jun. 17, 1986, now abandoned which is a continuation-in-part to U.S. application Ser. No. 741,858, filed Jun. 6, 1985, now U.S. Pat. No. 4,612,299, which was a continuation-in-part to U.S. application Ser. Nos. 629,910, filed Jul. 9, 1984, now abandoned, and 592,910, filed Mar. 23, 1984, now the above-described U.S. Pat. No. 4,540,679, all of which are assigned to a common assignee and are incorporated by reference herein.

The possible solid catalyst components listed above are only illustrative of many possible solid, magnesium-containing, titanium halide-based, hydrocarbon-insoluble catalyst components useful in this invention and known to the art. This invention is not limited to a specific supported catalyst or catalyst component.

Titanium (IV) compounds useful in preparing the solid titanium-containing catalyst component of invention are titanium halides and haloalcoholates having 1 to about 20 carbon atoms per alcoholate group. Mixtures of titanium compounds can be employed if desired. Preferred titanium compounds are the halides and haloalcoholates having 1 to about 8 carbon atoms per alcoholate group. Examples of such compounds include $TiCl_4$, $TiBr_4$, $Ti(OCH_3)Cl_3$, $Ti(OC_2H_5)Cl_3$, $Ti(OC_4H_9)Cl_3$, $Ti(OC_6H_5)Cl_3$, $Ti(OC_6H_{13})Br_3$, $Ti(OC_8H_{17})Cl_3$, $Ti(OCH_3)_2Br_2$, $Ti(OC_2H_5)Cl_2$, $Ti(OCH_6H_{13})_2Cl_2$, $Ti(OC_8H_{17})_2Br_2$, $Ti(OCH_3)_3Br$, $Ti(OC_2H_5)_3Cl$, $Ti(OC_4H_9)_3Cl$, $Ti(OC_6H_{13})_3Br$, and $Ti(OC_8H_{17})_3Cl$. Titanium tetrahalides, particularly titanium tetrachloride ($TICl_4$), are most preferred.

Organic electron donors useful as internal modifiers in preparation of stereospecific supported titanium-containing catalyst components many times can be organic compounds containing one or more atoms of oxygen, nitrogen, sulfur, and phosphorus. Such compounds include organic acids, organic acid esters, alcohols, ethers, aldehydes, ketones, amines, amine oxides, amides, thiols and various phosphorous acid esters and amides, and the like. Mixtures of organic electron donors can be used if desired. Specific examples of useful oxygen-containing electron donor compounds include organic acids and esters. Useful organic acids contain from 1 to about 20 carbon atoms and 1 to about 4 carboxyl groups.

Preferred titanium component electron donor compounds as internal modifiers include esters of aromatic acids. Preferred organic electron donors are $C_1$–$C_6$ alkyl esters of aromatic mono- and dicarboxylic acids and halogren-, hydroxyl-, oxo-, alkyl-, alkoxy-, aryl-, and aryloxy-substituted aromatic mono- or dicarboxylic acids. Among these, the alkyl esters of benzoic and halobenzoic acids wherein the alkyl group contains 1 to 6 carbon atoms, such as methyl benzoate, methyl bromobenzoate, ethyl benzoate, ethyl chlorobenzoate, ethyl bromobenzoate, butyl benzoate, isobutyl benzoate, hexyl benzoate, and cyclohexyl benzoate, are preferred. Other preferable esters include ethyl p-anisate and methyl-p-toluate. An especially preferred aromatic ester is a dialkylphthalate ester in which the alkyl group contains from about two to about ten carbon atoms. Examples of preferred phthalate ester are diisobutylphthalate, ethylbutylphthalate, diethylphthalate, and di-n-butylphthalate.

The electron donor component that may be used as internal modifiers in preparation of the solid catalyst component is used in an amount ranging from about 0.001 to about 1.0 mole per gram atom of titanium, and preferably from about 0.005 to about 0.9 mole per gram atom. Best results are achieved when this ratio ranges from about 0.01 to about 0.8 mole per gram atom of titanium.

Although not required, the solid reaction product prepared as described herein may be contacted with at least one liquid Lewis acid prior to polymerization. Such Lewis acids useful according to this invention are materials which are liquid at treatment temperatures and have a Lewis acidity high enough to remove impurities such as unreacted starting materials and poorly affixed compounds from the surface of the above-described solid reaction product. Preferred Lewis acids include halides of Group III–V metals which are in the liquid state at temperatures up to about 170° C. Specific examples of such materials include $BCl_3$, $AlBr_3$, $TiCl_4$, $TiBr_4$, $SiCl_4$, $GeCl_4$, $SnCl_4$, $PCl_3$ and $SbCl_5$. Preferable Lewis acids are $TiCl_4$ and $SiCl_4$. Mixtures of Lewis acids can be employed if desired. Such Lewis acid may be used in a compatible diluent.

The method of this invention for controlling the performance of the aforesaid polymerization reaction in order to afford the production of a particulate polymer product having predetermined characteristics of at least one of the melt flow rate thereof and the weight percent therein of the second monomer, if any, comprises, for each reactor employed:

($a_1$) determining relationships between the melt flow rate of the particulate polymer product withdrawn from such reactor and a first set of parameters comprising the rates of introduction of quench liquid and vapor recycle into each zone of such reactor, the heat of polymerization in such reactor, the latent heat of vaporization of the quench liquid in such reactor, the total mass inventory of particulate polymer product in such reactor and the fraction in each zone of such reactor of the aforesaid total mass inventory in such reactor, the mole ratio of hydrogen to the first monomer, preferably propylene, in the vapor phase in such reactor, the mole ratio of the second monomer, preferably ethylene, to the first monomer, preferably propylene, in the vapor phase in such reactor, the mole ratio of the aforesaid second metal to the aforesaid first metal introduced into such reactor, the molecular weights of the first and second monomers, the relative reactivities of the first and second monomers in the formation of the copolymer if copolymerization occurs, and the temperature and pressure in such reactor; ($b_1$) monitoring such first set of parameters; ($c_1$) from the first set of parameters monitored in step ($b_1$) and the relationships from step ($a_1$), calculating the melt flow rate of the polymer withdrawn from such reactor; and ($d_1$) adjusting at least one of the reactor operating variables within minimum and maximum constraints thereof to adjust the calculated melt flow rate of the polymer withdrawn from such reactor to a pre-determined, set point level therefor, wherein such reactor variables are the mole ratio of the second monomer to the first monomer, if copolymerization is occurring, in the vapor phase in such reactor in the range of from about 0.0005 to about 0.5, preferably for random copolymers from about 0.004 to about 0.03, and preferably for impact copolymers from about 0.2 to about 0.4, the mole ratio of hydrogen to the first monomer in the vapor phase in such reactor in the range of from about 0.0005, preferably from about 0.002, to about 0.08, preferably to about 0.04, the mole ratio of the second metal to the first metal introduced into such reactor in the range of from about 14, preferably from about 60, to about 200, preferably to about 120, the rate of introduction of the quench liquid into each zone of such reactor in the range of from about 5 kg/sec, preferably from about 15 kg/sec, to about 50 kg/sec, preferably to about 35 kg/sec, the ratio of the rate of introduction of the vapor recycle to the rate of introduction of quench liquid into each zone of such reactor in the range of from about 0.05, preferably from about 0.1, to about 0.3, preferably to about 0.2, and the temperature in each reactor in the range of from about 20° C., preferably from about 50° C., to about 100° C., preferably to about 80° C.

Preferably, the method of the present invention additionally comprises, for each reactor employed: ($a_2$) determining relationships between the weight percent of the second monomer in the particulate copolymer product, if copolymerization occurs, withdrawn from such reactor and a second set of parameters comprising the rates of introduction of quench liquid and vapor recycle into each zone of such reactor, the heat of polymerization in such reactor, the latent heat of vaporization of the quench liquid in such reactor, the total mass inventory of particulate product in such reactor and the fraction in each zone of such reactor of the aforesaid total mass inventory in such reactor, the mole ratio of second monomer to the first monomer in the vapor phase in such reactor, the relative reactivities of the first and second monomer in the formation of the copolymer, and the molecular weights of the first and second monomers; ($b_2$) monitoring such second set of parameters; ($c_2$) from the second set of parameters monitored in step ($b_2$) and the relationships from step ($a_2$), calculating the weight percent of the second monomer in the copolymer product withdrawn from such reactor; and ($d_2$) adjusting at least one of the reactor operating variables within minimum and maximum constraints thereof to adjust the weight percent of second monomer in the copolymer withdrawn from such reactor to a pre-determined level therefor, wherein such reactor variables are the mole ratio of the second monomer to the first monomer in the vapor phase in such reactor in the range from about 0.0005 to about 0.5, preferably for random copolymers from about 0.004 to about 0.03, and preferably for impact copolymers from about 0.2 to about 0.4, the rate of introduction of the quench liquid into each zone of such reactor in the range of from about 5 kg/sec, preferably from about 15 kg/sec, to about 50 kg/sec, preferably to about 35 kg/sec, and the ratio of the rate of introduction of the vapor recycle to the rate of introduction of quench liquid into each zone of such reactor in the range of from about 0.05, preferably from about 0.1, to about 0.3, preferably to about 0.2.

In its most preferred embodiment, the method of the present invention for controlling the performance of the aforesaid polymerization reaction comprises, for each reactor employed: ($a_3$) determining the temperature and pressure in such reactor; ($b_3$) determining the mole ratios of (1) hydrogen to the first monomer in the vapor phase in such reactor, (2) the second monomer to the first monomer in the vapor phase in such reactor, and (3) the aforesaid second metal to the aforesaid first metal introduced into such reactor;

($c_3$) determining the rates in parts by weight per unit of time of the introduction of each of the quench liquid and the vapor recycle into each zone of such reactor; ($d_3$) determining the rate of production of the particulate polymer product in each zone of such reactor as follows:

$$R_z = \frac{L_z(1 + G_z/L_z)}{1 + H_p/H_v} \quad \text{(Equation 1)}$$

wherein the subscript Z is the number of the zone and ranges from 1 to N, $R_z$ is the production rate of the particulate polymer product in zone Z, $L_z$ is the rate of introduction of the quench liquid into zone Z, $G_z$ is the rate of introduction of the vapor recycle into zone Z, $H_p$ is the heat of polymerization in zone Z, and $H_v$ is the latent heat or vaporization of the quench liquid in zone Z; ($e_3$) determining the mass inventory of particulate polymer product in each zone of such reactor from the fraction in each such zone of the total mass inventory of particulate polymer product in such reactor and the total mass inventory of particulate polymer product in such reactor, as follows:

$$W_z = f_z W \quad \text{(Equation 2)}$$

wherein W is the aforesaid total mass inventory in such reactor, $f_z$ is the aforesaid fraction in the zone Z in such reactor, and $W_z$ is the aforesaid mass inventory in such zone Z; ($f_3$) determining the time constant for each zone of each reactor, as follows:

$$\tau_z = \frac{W_z}{\sum_{z=1}^{z} R_z} \quad \text{(Equation 3)}$$

wherein $\tau_z$ is the time constant in zone Z;

($g_3$) for the particulate polymer product being produced instantaneously within such reactor at any instant of steady-state or transition operation, determining at least one of the instantaneous melt flow rate thereof or the instantaneous weight percent of the second monomer therein as follows:

$$\ln(MFR_i) = \alpha - \frac{\beta}{T} + \gamma \ln\left[\left(\frac{H_2}{I}\right) + \delta\left(\frac{M_2}{M_1}\right)\right] + \quad \text{(Equation 4)}$$

$$\gamma \ln\left[\frac{(r_2 + r_3(II/I)(MW_{II}))}{r_2(MW)_{II} + (II/I)((MW_I) + (MW_{II})) + r_1(II/I)^2(MW_I)}\right]$$

$$\text{Wt. \% } II_i = \quad \text{(Equation 5)}$$

$$100 J \left[\frac{(r_1(II/I)^2 + (II/I))(MW_I)}{(r_1(II/I)^2 + (II/I))(MW_I) + (r_2 + (II/I))(MW_{II})}\right]$$

where $MFR_i$ is the instantaneous melt flow rate of the polymer product being produced in such reactor at that instant, Wt. % $II_i$ is the instantaneous weight percent of the second monomer, if any, in the polymer product being produced in such reactor at that instant, T is the temperature in degrees centigrade, $H_2/I$ is the mole ratio of hydrogen to the first monomer in the vapor phase in such reactor, $M_2/M_1$ is the mole ratio of the aforesaid second metal to the aforesaid first metal introduced into such reactor, II/I is the mole ratio of the second monomer to the first of the first monomer, $MW_{II}$ is the molecular weight of the second monomer, monomer in the vapor phase in such reactor, $MW_I$ is the molecular weight of the first monomer, J is the fraction of an impact copolymer that is represented by the random copolymer component thereof, and $\alpha$, $\beta$, $\gamma$, $\delta$, $r_1$, $r_2$ and $r_3$ are catalyst and reactor system—dependent constants which are determined from experimental data;

($h_3$) determining the value of X for the polymer product withdrawn from the last zone N of such reactor, as follows:

$$\text{(Equation 6)}$$

$$X_t^N = \left(\frac{\Delta t}{\tau_N + \Delta t}\right)\left[\left(\frac{R_N}{\sum_{z=1}^{N} R_z}\right) X_i + \left(\frac{\sum_{z=1}^{N-1} R_z}{\sum_{z=1}^{N} R_z}\right) X_t^{N-1}\right] +$$

-continued $$\left(\frac{\tau_N}{\tau_N + \Delta t}\right) X_{t-\Delta t}^N$$

wherein N is the number of the last zone in such reactor, N–1 is the number of the preceding zone, $x_t^N$ is the value of the $\ln(MFR_i)$ or Wt. % $II_i$, from zone N at time t, $\Delta t$ is the sampling time interval, $X_i$ is the instantaneous value of the $\ln(MFR_i)$ or Wt. % $II_i$ determined in Equations 4 or 5, respectively, $X_{t-\Delta t}^N$ is the calculated value of X for the same zone N but for the immediately preceding sampling interval and $X_t^{N-1}$ is the calculated value of X for the same sampling interval but for zone N–1;

($i_3$) determining the difference between $X_t^N$ or $MFR_t^N$ or Wt. % $II_t^N$, calculated in Equation 6 and the predetermined set point value therefor and in response to the determined difference, adjusting (1) at least one of the temperature, II/I, $H_2/I$, $M_2/M_1$, $L_z$, or $G_z/L_z$ for $MFR_t^N$, or (2) at least one of the II/I, $L_z$, or $G_z/L_z$ for Wt. % $II_t^N$;

in order to reduce the difference to a pre-determined acceptable level therefor.

When two reactors in series are employed, the zones for the first reactor are numbered starting with Z=1 for zone 1, and the zones for the second reactor are numbered starting with the next integer after the number of the last zone in the first reactor. Thus, N is the number of the last zone in the last reactor in the series of reactors.

Equations 1–6 are applicable to systems involving the use either of one reactor for the polymerization of a single monomer, preferably propylene, to produce a homopolymer or for the polymerization of two monomers, preferably propylene and ethylene, to provide a copolymer, or of two reactors in series in which a first monomer, preferably propylene, is polymerized in the first reactor to produce a homopolymer which is then transferred to a second reactor where a random copolymer is formed into the aforesaid homopolymer by copolymerization of the first monomer, preferably propylene with a second monomer, preferably ethylene, to afford an impact copolymer.

When only a single reactor is employed for the formation of either a homopolymer or a random copolymer, Equations 4 and 5 simplify to the following Equations 7 and 8, respectively:

$$\ln(MFR_i) = \alpha - \frac{\beta}{T} + \gamma \ln\left[\left(\frac{H_2}{I}\right) + \delta\left(\frac{M_2}{M_1}\right)\right] + \quad \text{(Equation 7)}$$

$$\gamma \ln\left[\frac{r_2(MW_{II})}{r_2(MW_{II}) + (II/I)((MW_I) + (MW_{II}))}\right]$$

$$\text{Wt. \% } II_i = \frac{100 (II/I)(MW_I)}{r_2(MW_{II}) + (II/I)((MW_I) + (MW_{II}))} \quad \text{(Equation 8)}$$

When only a single reactor is employed for the formation of a homopolymer, Equation 7 simplifies to Equation 9:

$$\ln(MFR_i) = \alpha - \frac{\beta}{T} + \gamma \ln\left[\left(\frac{H_2}{I}\right) + \delta\left(\frac{M_2}{M_1}\right)\right] \quad \text{(Equation 9)}$$

For the purpose of making the aforesaid calculations, the polymerization temperature can be measured by means of thermocouples or RTD, the polymerization pressure can be measured by means of a pressure transducer, the number of moles of hydrogen, the first monomer and the second monomer in the vapor phase in the reactor can be determined by gas chromatographic analysis of vapor withdrawn from the reactor, the number of moles of the first and second metals introduced into the reactor can be determined by flow meters located in the respective lines into the reactor and the composition of the catalyst and cocatalyst being introduced; the mass inventory of the reactor can be determined from empirical correlations from the direct proportionality of the total mass inventory W in the reactor to the amperage required to drive the drive shaft in the reactor or other convenient conventional instrumentation, and the rates of introduction of the quench liquid and vapor recycle into the reactor can be determined by flow meters for the respective lines to the reactor.

The values of $H_p$ and $H_v$ in a particular reactor depend on the specific temperature, pressure, and type of polymerization reaction occurring in that reactor. For example, when a homopolymer of propylene is being formed, $H_p$ is 24.9 kcal/mole, and propylene is typically employed as the quench liquid and has an $H_v$ of 3 kcal/mole. When a copolymer of propylene and ethylene is being formed, $H_p$ depends on the specific composition of the copolymer being formed and is typically 24.9–25.4 kcal/mole, and a mixture of propylene and ethylene is typically employed as the quench liquid and has an $H_v$ which depends on the relative amounts of propylene and ethylene and is typically 3–4 kcal/mole.

The values of $\alpha$, $\beta$, $\gamma$, $\delta$, r, $r_2$ and $r_3$ in Equations 4–9 for homopolymers, random copolymers and impact copolymers are presented in Table 1.

TABLE 1

| Coefficient | Homopolymer | Random Copolymer | Impact Copolymer |
|---|---|---|---|
| $\alpha$ | 16–19 | 16–19 | 16–19 |
| $\beta$ | 4000–7000 | 4000–7000 | 4000–7000 |
| $\gamma$ | 0.9–1.6 | 0.9–1.6 | 0.9–1.6 |
| $\delta$ | $1.0 \times 10^{-4} - 5.0 \times 10^{-4}$ | $1.0 \times 10^{-4} - 5.0 \times 10^{-4}$ | $1.0 \times 10^{-4} - 5.0 \times 10^{-4}$ |
| $r_1$ | 0 | 0.1–0.3 | 0.1–0.3 |
| $r_2$ | 0 | 0 | 1.0–5.0 |
| $r_3$ | 0 | 0 | 0.0–1.0 |

From the aforesaid measurements, constants and relationships, $R_z$, $W_z$ and $\tau_z$ for each zone in a particular reactor are determined using Equations 1, 2 and 3, respectively and then the instantaneous value of at least one of lnMFR$_i$ or Wt. % II$_i$ is then calculated for such reactor using Equations 4 or 5, respectively. These values are then inserted in Equation 6 to calculate the value of $X_t^N$ for the particulate polymer product withdrawn from such reactor. $X_t^N$ can be either ln(MFR$_t$) or Wt. % II$_t$.

The value of the property calculated in Equation 6 is then compared to a pre-determined, set point value for that property, and in response to the difference between the calculated and pre-determined, set point values of that property, an adjustment is made to reduce such difference to or below an acceptable level therefor. Typically, the adjustment is determined by a proportional integral controller or a proportional integral derivative controller.

The operating variables to be adjusted depend upon the identity of the property being controlled. In particular, when the adjustment is to be made in response to the difference between the calculated and pre-determined set point values of the melt flow rate, at least one of temperature, $H_2/I$, II/I, $M_{II}/M_I$, $L_z$ or $G_z/L_z$, preferably $H_2/I$ or $M_{II}/M_I$, and more preferably $H_2/I$, is adjusted in order to reduce or minimize the difference. For example, to increase the melt flow rate, the ratio $H_2/I$ is increased. When the adjustment is to be made in response to the difference between the calculated and pre-determined set points values of the Wt. % II, at least one of II/I, $L_z$ or $G_z/L_z$, preferably II/I, is adjusted in order to reduce or minimize the difference. For example, to increase the Wt. % II, while maintaining the MFR at a constant value, II/I is increased and $H_2/I$ is decreased.

Equations 1 and 6 were derived from mass and energy balances around each zone of each reactor. Equations 2 and 3 are definitions, and Equations 4 and 5 were derived from a kinetic model of the polymerization process. Equations 1–6 illustrate the relationships, for each reactor employed, between (a) the melt flow rate of the particulate polymer (homopolymer or copolymer) product withdrawn from such reactor and (b) a first set of parameters comprising the rates of introduction of quench liquid and vapor recycle into each zone of such reactor, the heat of polymerization in such reactor, the latent heat of vaporization of the quench liquid in such reactor, the total mass inventory of particulate product in such reactor and the fraction in each zone of such reactor of the aforesaid total mass inventory in such reactor, the mole ratio of hydrogen to the first monomer in the vapor phase in such reactor, the mole ratio of the second monomer to the first monomer in the vapor phase in such reactor, the mole ratio of the aforesaid second metal to the aforesaid first metal introduced into the reactor, the molecular weights of the first and second monomers, the relative reactivities of the first and second monomers in the formation of the copolymer, if copolymerization is occurring, and the reactor temperature and pressure.

Equations 1–6 also illustrate the relationships for each reactor employed, between (a) the weight percent of the second monomer in the particulate copolymer withdrawn from such reactor, if copolymerization is occurring, and (b) a second set of parameters comprising the rates of introduction of quench liquid and vapor recycle into each zone of such reactor, the heat of polymerization in such reactor, the latent heat of vaporization of the quench liquid in such reactor, the total mass inventory of particulate product in such reactor and the fraction in each zone of such reactor of the aforesaid total mass inventory in such reactor, the mole ratio of second monomer to the first monomer in the vapor phase in such reactor, the relative reactivities of the first and second monomers in the formation of the copolymer, if copolymerization is occurring, and the molecular weights of the first and second monomers.

Measurable values of $L_z$, $G_z$, W, $f_z$, T, $H_2$, I, II, $M_I$ and $M_{II}$, reported or determined values of $H_p$, $H_v$, $MW_I$ and $MW_{II}$, and empirically determined values of $\alpha$, $\beta$, $\gamma$, $\delta$, $r_1$, $r_2$ and $r_3$ are inserted in Equations 1–5 in order to determine values of $R_z$, $W_z$ and $\tau_z$ and values of the instantaneous MFR and Wt. % II for each zone of such reactor. These values are then inserted in Equation 6 to calculate the value of the property $X_t^N$ for the particulate polymer product withdrawn from the reactor. $X_t^N$ can be either ln(MFR$_t^N$) or Wt. % II$_t^N$.

Thus, for a single reactor having four zones, ln(MFR$_t^4$) is calculated as follows:

$$\ln(MFR_t^4)) = \frac{\Delta t}{\tau_4 + \Delta t} \left[ \left( \frac{R_4}{\sum_{z=1}^{4} R_z} \right) (\ln(MFR_i)) + \left( \frac{\sum_{z=1}^{3} R_z}{\sum_{z=1}^{4} R_z} \right) (\ln(MFR_i^3)) \right] + \left( \frac{\tau_4}{\tau_4 + \Delta t} \right) (\ln(MFR_{t-\Delta t}^4)) \quad \text{(Equation 10)}$$

However, solving Equation (10) involves calculating the instantaneous value of ln(MFR$_i$) for zone 3 of the reactor, which in turn necessitates calculating the instantaneous values of ln(MFR$_i$) for each of zones 1 and 2, as follows:

For zone 3

$$\ln(MFR_t^3) = \qquad \text{(Equation 11)}$$

$$\frac{\Delta t}{\tau_3 + \Delta t}\left[\left(\frac{R_3}{\sum_{z=1}^{3} R_z}\right)\ln(MFR_i) + \left(\frac{\sum_{z=1}^{2} R_z}{\sum_{z=1}^{3} R_z}\right)(\ln(MFR_t^2))\right] + \left(\frac{\tau_3}{\tau_3 + \Delta t}\right)(\ln(MFR_{t-\Delta t}^3))$$

For zone 2

$$\ln(MFR_t^2) = \qquad \text{(Equation 12)}$$

$$\frac{\Delta t}{\tau_2 + \Delta t}\left[\left(\frac{R_2}{\sum_{z=1}^{2} R_z}\right)\ln(MFR_i) + \left(\frac{\sum_{z=1}^{1} R_z}{\sum_{z=1}^{2} R_z}\right)(\ln(MFR_t^1))\right] + \left(\frac{\tau_2}{\tau_2 + \Delta t}\right)(\ln(MFR_{t-\Delta t}^2))$$

For zone 1

$$(\ln(MFR_t^1)) = \qquad \text{(Equation 13)}$$

$$\left(\frac{\Delta t}{\tau_1 + \Delta t}\right)(\ln(MFR_i)) + \left(\frac{\tau_1}{\tau_1 + \Delta t}\right)(\ln(MFR_{t-\Delta t}^1))$$

When, for example, two reactors in series are employed, the calculations illustrated by Equations 1–6 must be made for each reactor. For example, in the manufacture of an impact copolymer of propylene and ethylene, the first reactor is employed to polymerize propylene to form a homopolymer of propylene, which is then transferred to the second reactor where a random copolymer of propylene and ethylene is formed in the presence of and into the homopolymer from the first reactor. In such case, for the first reactor, Equation 4 simplifies to Equation 9, and Equation 5 is not applicable. Thus, the results from Equations 1–3 and 9 are employed in Equation 6 to calculate $\ln(MFR_t^N)$ for the particulate homopolymer product produced in and withdrawn from the first reactor. For the second reactor, the results of Equation 1–4 are employed in Equation 6 to calculate $\ln(MFR_t^N)$ for the random copolymer segment produced in and withdrawn from the second reactor. For the second reactor, the zones are numbered starting with the next integer after the number of the last zone in the first reactor. Thus, N is the number of the last zone in the second reactor.

The $\ln(MFR_t^N)$ for the composite impact copolymer is the weighted sum of the ln(MFR) of the polymer segment formed in each reactor. With J being the fraction of the impact copolymer represented by the random segment produced in the second reactor, 1-J is the fraction of the impact copolymer represented by the homopolymer segment produced in the first reactor. Thus, $\ln(MFR_t^N)$ of the impact copolymer is the sum of (1) the product of (1-J) multiplied by the value of $\ln(MFR_t^N)$ for the first reactor and (2) the product of J multiplied by the value of $\ln(MFR_t^N)$ for the second reactor. By contrast, the value of Wt. % II for an impact copolymer is determined directly from Equations 1–3, 5 and 6 for the second reactor.

Turning now to FIG. 2 for an illustration of an important benefit of the method of the present invention, being a simulation involving a single substantially horizontal, quench cooled, stirred bed reactor containing four aforesaid zones to make polypropylene homopolymer. Several options for increasing the ratio of hydrogen to propylene from that needed to make a homopolymer grade having an MFR of 3 to that needed to make of homopolymer grade having an MFR of 10, were tested. FIG. 2 contains plots of values of $\ln(MFR_t^4)$ calculated from Equation 6 using results from Equations 1–3 and 9, versus the time, measured from the time when the change in the hydrogen to propylene ratio was implemented.

In the base case (no overshoot), the aforesaid hydrogen to propylene ratio was increased in a conventional step change from the value therefor needed to produce the polymer with an MFR of 3 at steady state to the value therefor needed to produce the polymer with an MFR of 10 at steady state. In three other cases, the value of the aforesaid ratio was increased to a level above the value thereof needed to produce polypropylene having an MFR of 10 at steady state, in an effort to reduce the transition time needed to come to steady state. Overshoot durations of 10, 20 and 40 minutes were employed to illustrate that the overshoot duration must be optimized in order to achieve the deserved reduction in transition time from the first steady state for production of polypropylene having an MFR of 3 to the second steady state for production of polypropylene having an MFR of 10 at steady state. Selecting the degree of overshoot of the hydrogen to propylene ratio from Equation 9 as the aforesaid ratio needed to produce an instantaneous MFR of 30, calculated values of $(MFR_t^4)$ from Equation 6 plotted in FIG. 2 illustrate clearly that the beneficial effect of overshooting in reducing the transition time.

From the above description, it is apparent that the objects of the present invention have been achieved. While only certain embodiments have been set forth, alternative embodiments and various modifications will be apparent from the above description to those skilled in the art. These alternatives are considered equivalent and within the spirit and scope of the present invention.

Having described the invention, what is claimed is:

1. A method for the vapor-phase polymerization of at least one alpha-olefin monomer in a reaction mixture comprising a first alpha-olefin monomer and, if copolymerization is occurring, a second alpha-olefin monomer, comprising: conducting the polymerization under polymerization conditions of temperature and pressure in the presence of hydrogen and a catalyst system comprising a solid catalyst comprising a first metal and a cocatalyst comprising a second metal, in at least one reactor wherein in each such reactor at least a portion of the heat of polymerization is removed by evaporative cooling of a volatilizable quench liquid comprising liquefied first monomer and if copolymerization is occurring, liquefied second monomer, and wherein each reactor is a substantially horizontal reactor of substantially circular cross-section containing a centrally-located drive shaft extending longitudinally through such reactor to which are attached a plurality of adjacently located paddles, which paddles cause essentially no forward or backward movement of the particulate polymer product contained in such reactor and extend transversely within and to a short distance from the internal surfaces of such reactor; driving means in each such reactor for the drive shaft; one or more reactor off-gas outlets spaced along the topward part of each such reactor; a plurality of vapor recycle inlets spaced along the bottomward part of each such reactor for recycle of unreacted first monomer and, if copolymerization is occurring unreacted second monomer; one or more catalyst addition inlets spaced along each such reactor; a plurality of quench liquid inlets spaced along the topward part of each such reactor whereby quench liquid can be introduced into such reactor; and take-off means in each such reactor for said particulate polymer product at one or both ends of such reactor;

wherein the performance of the polymerization reaction is controlled in order to afford the production both at steady state and during transition operation in each such reactor of a particulate polymer product having predetermined characteristics of at least one of the melt flow rate thereof and the weight percent therein of the second monomer, if any, by a method comprising, for each reactor employed and both at steady state and during transition operation:

($a_1$) determining relationships between the melt flow rate of the particulate polymer product withdrawn from such reactor, and a first set of parameters comprising the rates of introduction of quench liquid and vapor recycle into each zone of such reactor, the heat of polymerization in such reactor, the latent heat of vaporization of the quench liquid in such reactor, the total mass inventory of particulate polymer product in such reactor and the fraction in each zone of such reactor of the aforesaid total mass inventory in such reactor, the mole ratio of hydrogen to the first monomer in the vapor phase in such reactor, the mole ratio of the second monomer to the first monomer in the vapor phase in such reactor, the mole ratio of the aforesaid second metal in said cocatalyst to the aforesaid first metal in said catalyst introduced into such reactor, the molecular weights of the first and second monomers, the relative reactivities of the first and second monomers in the formation of the copolymer if copolymerization occurs, and the temperature and pressure in such reactor;

($b_1$) monitoring such first set of parameters;

($c_1$) from the first set of parameters monitored in step ($b_1$) and the relationships from step ($a_1$), calculating the melt flow rate of the polymer withdrawn from such reactor; and ($d_1$) adjusting at least one of the reactor operating variables within minimum and maximum constraints thereof to adjust the calculated melt flow rate of the polymer withdrawn from such reactor to a predetermined set point level therefor, wherein such reactor variables are the mole ratio of the second monomer to the first monomer, if copolymerization is occurring, in the vapor phase in such reactor in the range of from about 0.0005 to about 0.5, the mole ratio of hydrogen to the first monomer in the vapor phase in such reactor in the range of from about 0.0005 to about 0.08, the mole ratio of the second metal in said cocatalyst to the first metal in said catalyst introduced into such reactor in the range of from about 14 to about 200, the rate of introduction of quench liquid into each zone of such reactor in the range of from about 5 kg/sec to about 50 kg/sec, the ratio of the rate of introduction of the vapor recycle to the rate of introduction of quench liquid into each zone of such reactor in the range of from about 0.05 to about 0.3, and the temperature in such reactor in the range of from about 20° C. to about 100° C.

2. The method of claim 1 which additionally comprises, for each reactor employed:

($a_2$) determining relationships between the weight percent of the second monomer in the particulate polymer product, if copolymerization occurs, withdrawn from such reactor, and a second set of parameters comprising the rates of introduction of quench liquid and vapor recycle into each zone of such reactor, the heat of polymerization in such reactor, the latent heat of vaporization of the quench liquid in such reactor, the total mass inventory of particulate copolymer product in such reactor, and the fraction in each zone of such reactor of the aforesaid total mass inventory in such reactor, the mole ratio of second monomer to the first monomer in the vapor phase in such reactor, the relative reactivities of the first and second monomers in the formation of the copolymer if copolymerization occurs, and the molecular weights of the first and second monomers;

($b_2$) monitoring such second set of parameters;

($c_2$) from the second set of parameters monitored in step ($b_2$) and the relationships from step ($a_2$), calculating the weight percent of the second monomer in the copolymer product withdrawn from such reactor; and ($d_2$) adjusting at least one of the reactor operating variables within minimum and maximum constraints thereof to adjust the weight percent of second monomer in the copolymer withdrawn from such reactor to a predetermined, set point level therefor, wherein such reactor variables are the mole ratio of the second monomer to the first monomer in the vapor phase in such reactor in the range of from about 0.0005 to about 0.5, the rate of introduction of the quench liquid into each zone of such reactor in the range of from about 5 kg/sec to about 50 kg/sec, and the ratio of the rate of introduction of the vapor recycle to the rate of introduction of quench liquid into each zone of such reactor in the range of from about 0.05 to about 0.3.

3. The method of claim 1 wherein, for each reactor employed:

($a_3$) the temperature and pressure in such reactor are determined;

($b_3$) the mole ratios of the following are determined:
(1) hydrogen to the first monomer in the vapor phase in such reactor,
(2) the second monomer to the first monomer in the vapor phase in such reactor, and
(3) the aforesaid second metal to the aforesaid first metal introduced into such reactor;

($c_3$) the rates in parts by weight per unit of time of the introduction of each of the quench liquid and the vapor recycle into each zone of such reactor are determined;

($d_3$) the rate of production of the particulate polymer product in each zone of such reactor is determined as follows:

$$R_z = \frac{L_z(1 + G_z/L_z)}{1 + H_p/H_v} \quad \text{(Equation 1)}$$

wherein the subscript Z is the number of the zone and ranges from 1 to N, $R_z$ is the production rate of the particulate polymer product in zone Z, $L_z$ is the rate of introduction of the quench liquid into zone Z, $G_z$ is the rate of introduction of the vapor recycle into zone Z, $H_p$ is the heat of polymerization in zone Z, and $H_v$ is the latent heat or vaporization of the quench liquid in zone Z;

($e_3$) the mass inventory of particulate polymer product in each zone of such reactor is determined from the fraction in each zone of the total mass inventory of particulate polymer product in such reactor and the total mass inventory, of particulate polymer product in such reactor, as follows:

$$W_z = f_z W \quad \text{(Equation 2)}$$

wherein W is the aforesaid total mass inventory in such reactor, $f_z$ is the aforesaid fraction in the zone Z in such reactor, and $W_z$ is the aforesaid mass inventory in such zone Z;

($f_3$) the time constant for each zone of such reactor is determined, as follows:

$$\tau_z = \frac{W_z}{\sum_{z=1}^{z} R_z} \quad \text{(Equation 3)}$$

wherein $\tau_z$ is the time constant in zone Z;

($g_3$) at least one of the instantaneous melt flow rate and the instantaneous weight percent of the second monomer in the particulate polymer product being produced instantaneously within such reactor at any instant of steady-state or transition operation is determined, as follows:

$$\ln(MFR_i) = \alpha - \frac{\beta}{T} + \gamma \ln\left[\left(\frac{H_2}{I}\right) + \delta\left(\frac{M_2}{M_1}\right)\right] + \quad \text{(Equation 4)}$$

$$\gamma \ln\left[\frac{(r_2 + r_3(II/I)(MW_{II}))}{r_2(MW)_{II} + (II/I)((MW_I) + (MW_{II})) + r_1(II/I)^2(MW_I)}\right]$$

$$\text{Wt. \% } II_i = \quad \text{(Equation 5)}$$

$$100 \, J \left[\frac{(r_1(II/I)^2 + (II/I))(MW_I)}{(r_1(II/I)^2 + (II/I))(MW_I) + (r_2 + (II/I))(MW_{II})}\right]$$

where $MFR_i$ is the melt instantaneous flow rate of the polymer being produced within such reactor at that instant, Wt. % $II_i$ is the instantaneous weight percent of the second monomer in the polymer product being produced in such reactor at that instant, T is the temperature, $H_2/I$ is the mole ratio of hydrogen to the first monomer in the vapor phase in such reactor, $M_2/M_1$ is the mole ratio of the aforesaid second metal to the aforesaid first metal introduced into such reactor, $II/I$ is the mole ratio of the second monomer to the first monomer in the vapor phase in such reactor, $MW_I$ is the molecular weight of the first monomer, $MW_{II}$ the molecular weight of the second monomer, and $\alpha$, $\beta$, $\gamma$, $\delta$, $r_1$, $r_2$ and $r_3$ are catalyst and reactor system dependant constants which are determined by experimental data;

($h_3$) the value of X is determined for the polymer product withdrawn from such reactor, as follows:

$$X_t^N = \left(\frac{\Delta t}{\tau_N + \Delta t}\right)\left[\left(\frac{R_N}{\sum_{z=1}^{N} R_z}\right) X_i + \left(\frac{\sum_{z=1}^{N-1} R_z}{\sum_{z=1}^{N} R_z}\right) X_t^{N-1}\right] + \quad \text{(Equation 6)}$$

$$\left(\frac{\tau_N}{\tau_N + \Delta t}\right) X_{t-\Delta t}^N$$

wherein N is the number of the last zone in such reactor, N−1 is the number of the preceding zone, $X_t^N$ is the value of the $\ln(MFR_t)$, or Wt. % $II_t$, of the particulate polymer product withdrawn from zone N at time t, $\Delta t$ is the sampling time interval, $X_i$ is the instantaneous value of the $\ln(MFR_i)$, or Wt. % $II_i$ determined in Equations 4 or 5, respectively, $X_{t-\Delta t}^N$ is the calculated value of X for the same zone N but for the immediately preceding sampling interval, and $X_t^{N-1}$ is the calculated value of X for the same sampling interval, but for zone N−1; and ($i_3$) determining the difference between $X_t^N$ for $MFR_t^N$ or Wt. % $II_t^N$ calculated in Equation 6 and the predetermined set point value therefor and in response to the determined difference, adjusting (1) at least one of the temperature, $II/I$, $H_2/I$, $M_2/M_1$, $L_z$, or $G_z/L_z$ for $MFR_t^N$, or (2) at least one of the $II/I$, $L_z$, or $G_z/L_z$ for Wt. % $II_t^N$;

in order to reduce the difference between such determined and predetermined set point values to a predetermined acceptable level therefor.

4. The method of claim 1 wherein the first monomer is propylene and homopolymerization occurs.

5. The method of claim 4 wherein the mole ratio of hydrogen to propylene in the vapor phase in the reactor is in the range of from about 0.002 to about 0.04.

6. The method of claim 1 wherein a single reactor is employed, the first monomer is propylene and the second monomer is ethylene and copolymerization occurs and a random copolymer is formed.

7. The method of claim 6 wherein the mole ratio of hydrogen to propylene in the vapor phase in each reactor is in the range of from about 0.002 to about 0.04 and the mole ratio of ethylene to propylene in the range of from about 0.004 to about 0.03.

8. The method of claim 1 wherein the first metal is titanium.

9. The method of claim 1 wherein the second metal is aluminum.

10. The method of claim 8 wherein the second metal is aluminum.

11. The method of claim 10 wherein the mole ratio of aluminum to titanium introduced into each reactor is in the range of from about 60 to about 120.

12. The method of claim 1 wherein two reactors are employed in series, and a homopolymer of propylene is prepared in the first reactor and is passed into the second reactor where an impact copolymer is formed by the copolymerization of propylene and ethylene in the presence of the homopolymer of propylene.

13. The method of claim 12 wherein in the second reactor the mole ratio of ethylene to propylene in the vapor phase is in the range of from about 0.2 to about 0.4.

* * * * *

UNITED STATES PATENT AND TRADEMARK OFFICE
CERTIFICATE OF CORRECTION

PATENT NO.: 5,504,166

DATED: April 2, 1996

INVENTOR(S): Alberto Buchelli, Malamas Caracotsios

It is certified that error appears in the above-identified patent and that said Letters Patent is hereby corrected as shown below:

Patent reads:

| Col. | Line | |
|---|---|---|
| 1 | 32-33 | "a first meted and a cocatalyst comprising a second meted" should read --a first metal and a cocatalyst comprising a second metal-- |
| 2 | 48 | "the melt How rate" should read --the melt flow rate-- |
| 7 | 35 | "one o#more possible locations 18 and 20." should read --one of more possible locations 18 and 20.-- |
| 11 | 44-45 | "Solid magnesium alkoxide may be milled prior to further treatmen" should read --Solid magnesium alkoxide may be milled prior to further treatment.-- |
| 13 | 7 | "Lewis adds" should read --Lewis acids-- |

UNITED STATES PATENT AND TRADEMARK OFFICE
CERTIFICATE OF CORRECTION

PATENT NO.: 5,504,166

DATED: April 2, 1996

INVENTOR(S): Alberto Buchelli, Malamas Caracotsios

It is certified that error appears in the above-identified patent and that said Letters Patent is hereby corrected as shown below:

Patent reads:

| Col. | Line | |
|---|---|---|
| 16 | 15 | "determining the difference between $X_t^N$ -- for $MFR_t^N$" should read --determining the difference between $X_t^N$ for $MFR_t^N$-- |
| 23 | 37-38 | "$MW_{II}$ the molecular weight of the second monomer," should read --$MW_{II}$ is the molecular weight of the second monomer,-- |

Signed and Sealed this

First Day of July, 1997

Attest:

BRUCE LEHMAN

*Attesting Officer*    *Commissioner of Patents and Trademarks*